United States Patent
Szente et al.

(10) Patent No.: US 7,648,561 B2
(45) Date of Patent: Jan. 19, 2010

(54) PROCESS AND APPARATUS FOR USE IN RECYCLING COMPOSITE MATERIALS

(75) Inventors: Roberto Nunes Szente, São Paulo (BR); Milton Oscar Szente, São Paulo (BR)

(73) Assignee: TSL Engenharia, Manutencao e Preservacao Ambiental Ltda., Sao Paulo (BR)

( * ) Notice: Subject to any disclaimer, the term of this patent is extended or adjusted under 35 U.S.C. 154(b) by 406 days.

(21) Appl. No.: 11/284,606

(22) Filed: Nov. 22, 2005

(65) Prior Publication Data

US 2007/0113705 A1     May 24, 2007

(51) Int. Cl.
    *C22B 21/06*     (2006.01)
(52) U.S. Cl. .................. 75/686; 75/687; 75/10.27
(58) Field of Classification Search .......... 75/686, 75/687
See application file for complete search history.

(56) References Cited

U.S. PATENT DOCUMENTS

| | | | | |
|---|---|---|---|---|
| 4,153,564 A | * | 5/1979 | Chibnik ................. 508/280 |
| 5,016,809 A | * | 5/1991 | Winterbottom et al. ..... 228/205 |
| 5,405,428 A | * | 4/1995 | Dube et al. ............... 75/403 |
| 5,447,548 A | * | 9/1995 | Lindsay .................. 75/10.21 |
| 5,801,907 A | | 9/1998 | Yagi et al. |
| 5,810,907 A | * | 9/1998 | Okada et al. ............. 75/687 |
| 2003/0129077 A1 | * | 7/2003 | Koch et al. .............. 420/542 |

FOREIGN PATENT DOCUMENTS

| | | |
|---|---|---|
| JP | 01287231 | 11/1989 |
| JP | 01287231 A | * 11/1989 |
| JP | 07242890 A | * 9/1995 |

* cited by examiner

*Primary Examiner*—George Wyszomierski
*Assistant Examiner*—Tima M McGuthry-Banks
(74) *Attorney, Agent, or Firm*—Bachman & LaPointe, P.C.

(57) ABSTRACT

A process for recycling composite materials includes the steps of feeding a quantity of composite material composed of at least one polymer and aluminum into at least one first reactor; heating the composite material in a non-oxidizing environment at a temperature sufficient to volatilize the at least one polymer and form a hydrocarbon by-product and aluminum in the at least one first reactor; feeding the aluminum free of the at least one polymer into a second reactor; and heating the aluminum in a non-oxidizing environment at a temperature sufficient to melt the aluminum in the second reactor.

17 Claims, 4 Drawing Sheets

PROCESS AND APPARATUS FOR USE IN RECYCLING COMPOSITE MATERIALS

BACKGROUND OF THE INVENTION

The invention relates to processes and apparatus for recycling. More particularly, the invention relates to processes and apparatus for recycling composite materials.

There are several types of packaging used for food products or for different industrial products in general. Most food and industrial product packaging is typically constructed in one of the following forms: a) paper board, for example, cardboard; b) plastic, for example, polyethylene terephtalatic (PET); c) paper/plastic, for example, beverage cartons; d) plastic/aluminum laminates, for example, packaging for coffee, dry soups, dog food, chocolates, cereals, etc.; and, e) paper/plastic/aluminum, for example, beverage cartons for orange juice, milk, etc.

When the food and industrial product packaging contains only paper (as in (a)) or paper/plastic (as in case (c)), the public has already discovered processes to recycle such packaging materials. For example, paper packaging is fed into hydro-pulping equipment to desegregate the paper fibers. The separated paper fibers are then removed with water and dried in a paper machine. The resulting recycled paper may then be reused, for example, to make cardboard boxes for instance. In the case where the food and industrial product is a composite material such as paper/plastic (as in case (c)), the plastic is separated automatically in the hydro-pulping, and normally discarded since the plastic is (1) rarely made of only one type of plastic and (2) contains contaminants, which makes it difficult to reuse the plastic rejects.

When the food and industrial product packaging contains only plastic such as bottles, the recycling process involves washing, drying and grinding the plastic packaging, and extruding and melting the ground plastic packaging in order to form a new, recycled plastic product.

The recycling of food or industrial packaging becomes challenging where plastic/aluminum laminates and paper/plastic/aluminum composite materials are concerned. For example, both types of packaging typically contain a very thin piece of aluminum foil, for example, less than 10 microns thick, intimately joined with a plastic component, for example, a plastic sheet less than 100 microns thick, and paper. The paper can be recycled using recycling processes already described. However, the plastic and aluminum rejects cannot be recycled.

There are no commercial recycling processes for recycling plastic and aluminum rejects from plastic/aluminum packaging and paper/plastic/aluminum packaging due to the difficulties associated with separating the plastic from the aluminum. Moreover, whereas paper/plastic/aluminum contains one type of plastic, plastic/aluminum packaging generally utilizes more than one type of plastic. For example, the plastic component typically contains polyethylene (PE), with minor amounts of polypropylene (PP) and polyethylene terephtalatic (PET) also present. These factors contribute to the present inability to effectively recycle plastic/aluminum and paper/plastic/aluminum packaging.

Plastic/aluminum food and industrial packaging and the plastic/aluminum rejects, for example, factory wastes, spent packaging, etc., are not being properly recycled; most of these materials are being dumped into landfills or incinerated. Although incineration sounds like an efficient process, incineration possesses some operating difficulties due to the presence of the aluminum. Aluminum does not "burn" and generate gas, rather aluminum oxidizes and generates aluminum oxide, a solid waste, which needs to be periodically removed from the incinerators.

At the present time, Corenso United Oy Ltd. of Finland utilizes a pyrolysis process to recycle paper/plastic/aluminum packaging once the paper component is removed. Pyrolysis is conducted for generating a combustible gas that can be used to generate energy. However, the remaining aluminum foil, in pieces, cannot be recycled or reused. During pyrolysis, the aluminum partially oxidizes and the oxidized aluminum becomes difficult to melt. Aluminum oxide will form from the outside to the inside of the aluminum foil. Aluminum oxide melts at temperatures above 1,700° C. and does not melt at temperatures of 700° C., the melting point of aluminum. Since the aluminum foil is very thin to begin with, even a thin oxide layer becomes a significant obstacle and prevents successfully melting the aluminum foil. In addition, the pyrolysis process creates aluminum/aluminum oxide residues and generates a considerable amount of burnt gases. Hence, pyrolysis is not an environmentally friendly process and fails to effectively recycle aluminum from paper/plastic/aluminum food and industrial packaging.

SUMMARY OF THE INVENTION

In accordance with the present invention, a process for recycling composite materials broadly comprises feeding a quantity of composite material broadly comprising at least one polymer and aluminum into at least one first reactor; heating said composite material in a non-oxidizing environment at a temperature sufficient to volatilize the at least one polymer and form a hydrocarbon by-product and aluminum in the at least one first reactor; feeding the aluminum free of the at least one polymer into a second reactor; and heating the aluminum in a non-oxidizing environment at a temperature sufficient to melt the aluminum in the second reactor.

In accordance with the present invention, a system for recycling composite materials broadly comprises at least one first reactor comprising an external heating element disposed about a mixing cavity containing at least two screws comprising a shaft and at least two internal heating elements disposed therein; and a second reactor comprising a plasma heating system disposed proximate to a melt bath.

In accordance with the present invention, a reactor broadly comprises an external heating element disposed about a mixing cavity containing at least two screws comprising a shaft and at least two internal heating elements disposed therein.

In accordance with the present invention, a reactor broadly comprises a plasma heating system disposed proximate to a melt bath coated with a material having refractory properties.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 2b is a representation of a lateral view of the first reactor of FIG. 2a;

Like reference numbers and designations in the various drawings indicate like elements.

DETAILED DESCRIPTION

As used herein, the term "hydrocarbon by-product" means a hydrocarbon composition comprising a plurality of hydrocarbon chain compositions each having about 6 to about 10,000 carbon atoms per chain, preferably about 6 to about 1000 carbon atoms per chain, most preferably about 6 to about 100 carbon atoms per chain, and existing in one or more of the following states of matter: as a solid, solid-liquid, liquid, liquid-gas or gas.

As used herein, the term "hydrocarbon product" means a hydrocarbon composition that at room temperature exists in one or more of the following states of matter: solid, solid-liquid, liquid, liquid-gas or gas.

As used herein, the term "aluminum by-product" means a by-product composed of aluminum that is free of any oxides of aluminum.

As used herein, the term "at least one first reactor"means one or a series of reactors connected together that maintain a non-oxidizing environment and operate at a temperature sufficient to volatilize polymers and form at least one hydrocarbon by-product.

As used herein, the term "a second reactor" means a reactor that maintains a non-oxidizing environment and receives aluminum free of at least one polymer.

Figure 1A:
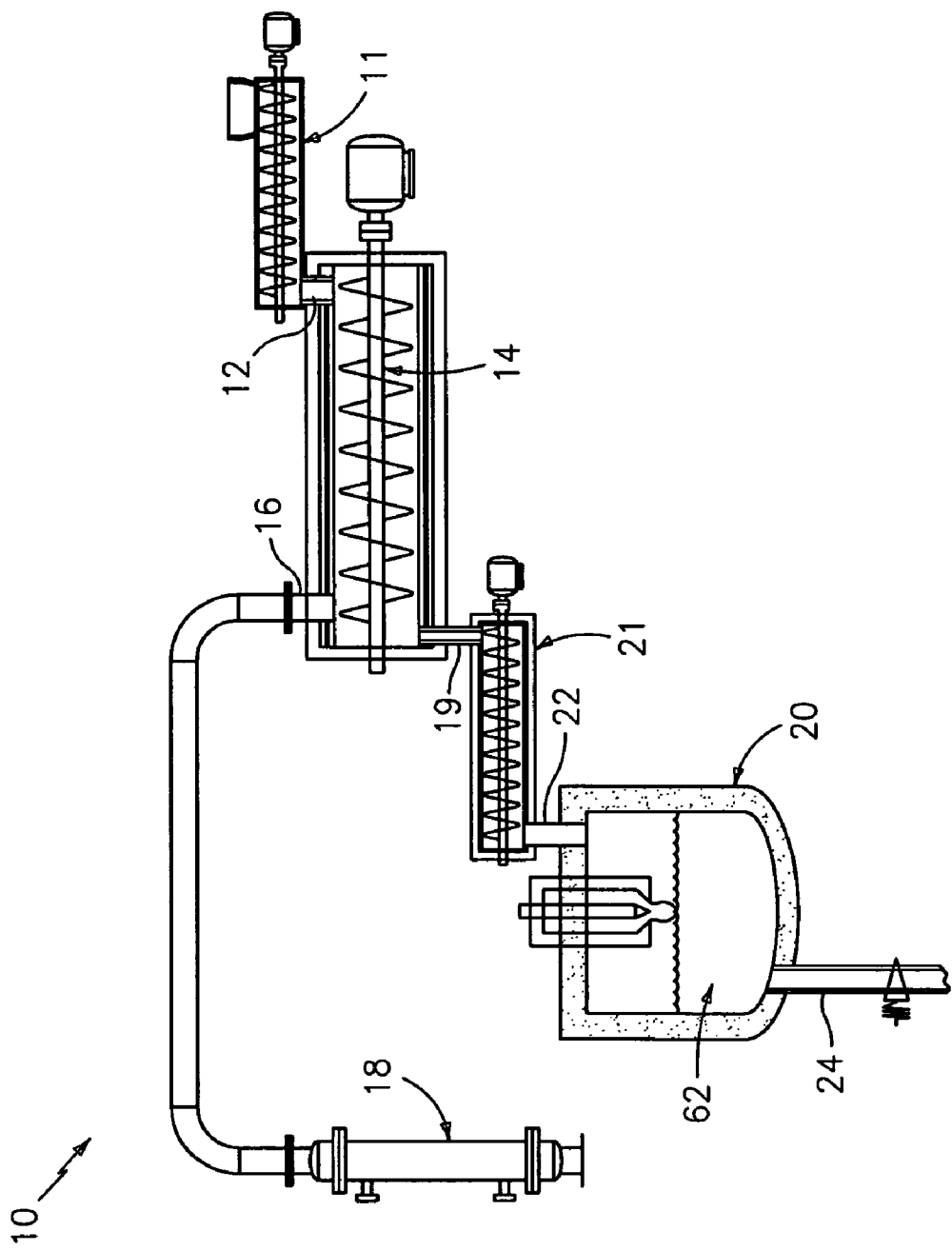
FIG. 1a is a representation of a lateral view of a system for recycling composite materials.
Figure 1B:
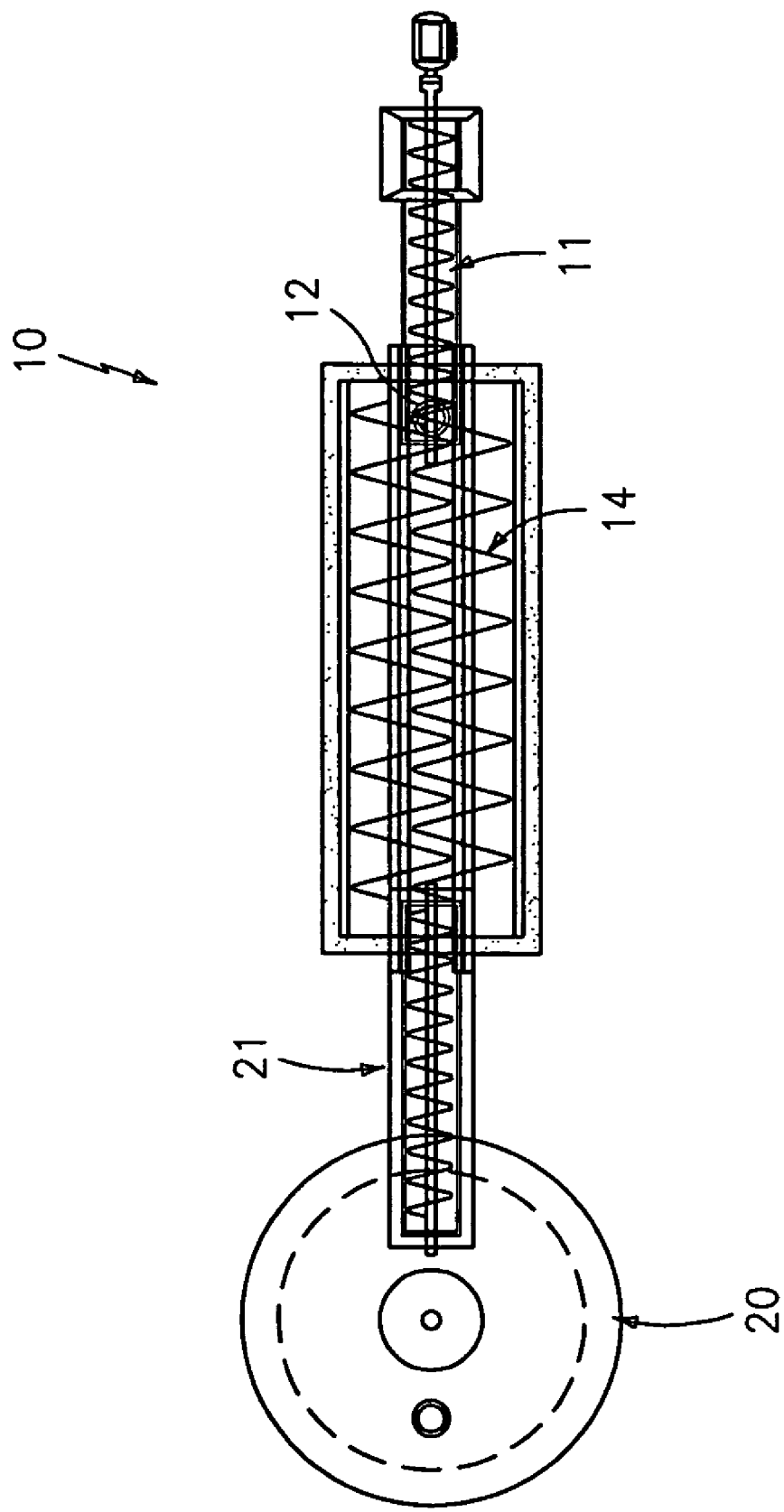
FIG. 1b is a representation of a top view of the system of FIG. 1.

Referring now to FIGS. 1a-b, a system 10 of the present invention is shown. The system 10 of the present invention maintains a non-oxidizing environment through the entire process. The non-oxidizing environment ensures the aluminum oxide layer present upon the aluminum does not increase in thickness and the polymer does not react to form CO, $CO_2$, $H_2O$ and other undesirable by-products during the process of the present invention. The system 10 for recycling composite materials may comprise a means for feeding 11 a quantity of composite material (not shown) into an injection port 12 of at least one first reactor 14. During a first phase of the process for recycling composite materials, a composite material generally comprising at least one polymer and aluminum is introduced into the first reactor 14 through the injection port 12. An inert gas is preferred in order to maintain the desired non-oxidizing environment. The composite material may be processed at a temperature sufficient to volatilize the polymer component and form a condensable, gaseous hydrocarbon by-product and aluminum free of at least one polymer. The hydrocarbon by-product may be removed from the first reactor 14 through a hydrocarbon by-product outlet 16. The hydrocarbon by-product outlet 16 may be connected to a means for condensing 18 where the hydrocarbon by-product is condensed to form at least one hydrocarbon by-product. The outlet for processed materials may be in communication with another first reactor 14 in order to further process any remaining polymer component of the composite material, or may be in communication with an injection port 22 of a second reactor 20.

During the second phase of the process for recycling composite materials, the aluminum free of at least one polymer may be transported from an outlet for processed materials 19 of the first reactor 14 through a means for feeding 21 and into the injection port 22 of the second reactor 20. In the second reactor 20, the aluminum is heated at a temperature sufficient to melt the aluminum. Due to the absence of oxygen the aluminum oxide layer does not grow and increase in thickness. The aluminum free of at least one polymer may then be removed through an outlet 24 and cooled to form at least one aluminum by-product.

Figure 2A:
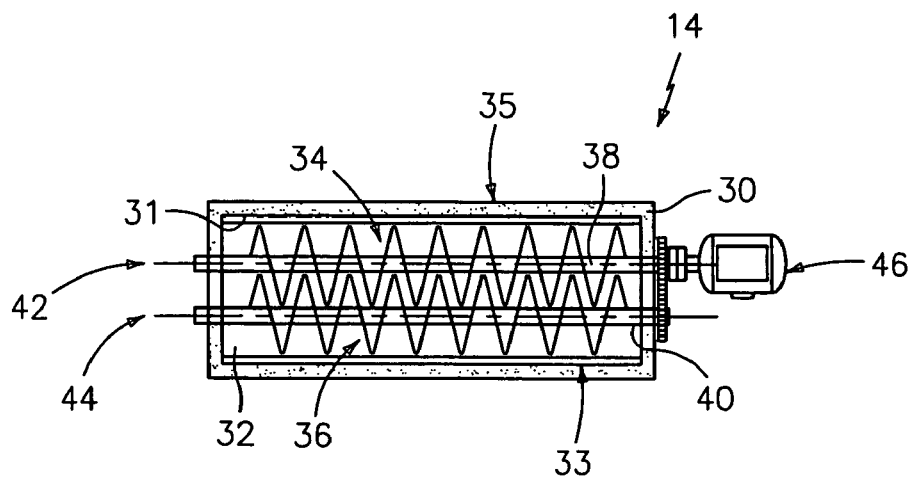
FIG. 2a is a representation of a top view of a first reactor of the system of FIGS. 1a and 1b.
Figure 2B:
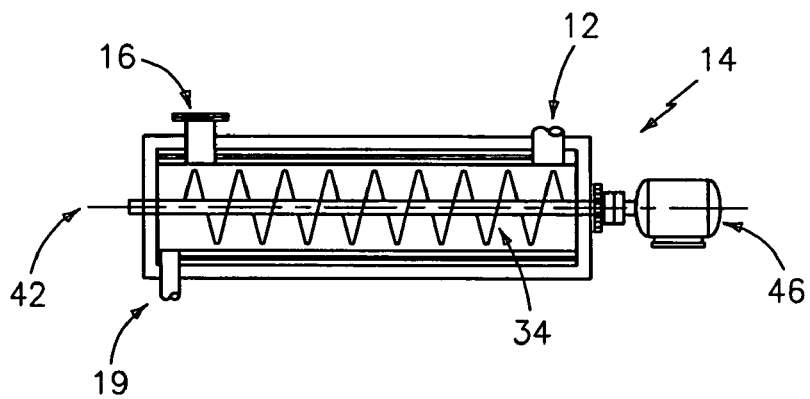
Figure 2C:
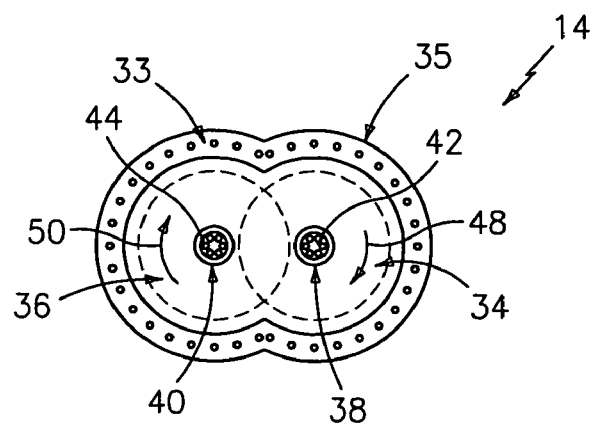
FIG. 2c is a representation of a cross-sectional view taken along lines A-A of FIG. 2b of the first reactor.

Referring now to FIGS. 2a-2c, at least one first reactor 14 may comprise a shell 30 disposed about a mixing cavity 32. The mixing cavity 32 has an interior surface 31 and is in communication with both the injection port 12 and outlets 16, 19. A quantity of thermal insulating material 35 may be disposed upon the external surface of the shell 30. The thermal insulating material may comprise, but is not limited to, fibrous ceramic materials, silica, alumina, combinations comprising at least one of the foregoing, and the like, and preferably a mixture of silica and alumina where the amount of silica present is greater than the amount of alumina present. An external heating element 33, such as an electrical heating element, may be disposed between the interior surface 31 and shell 30. The external heating element 33 serves to heat the composite material of the mixing cavity 32 during operation. The external heating element 33 may sustain a temperature sufficient to volatilize the at least one polymer component and form the condensable, gaseous hydrocarbon by-product. In addition, the external heating element 33 may also be provided outside the first reactor 14. For example, a heat source (not shown) may provide a heated fluid, such as oil, gas, water, steam, combinations comprising at least one of the foregoing fluids, and the like, via a conduit (not shown) to the first reactor 14. The conduit may enter the first reactor 14 and be disposed between the interior surface 31 and the shell 30 so that the fluid may circulate and heat the mixing cavity 32 to a temperature sufficient to volatilize the at least one polymer component and form the condensable, gaseous hydrocarbon by-product.

To process the composite material, the first reactor 14 includes at least two screws 34, 36 comprising a first screw 34 mounted on a first shaft 38 and a second screw 36 mounted on a second shaft 40 disposed within the mixing cavity 32. Each shaft 38, 40 contain an internal heating element 42, 44 disposed therein. Like the external heating element 33, each internal heating element 42, 44 of the first reactor 14 may also heat the composite materials of the mixing cavity 32 during operation. The internal heating elements 42, 44 may comprise an electrical resistance heating element known to one of ordinary skill in the art. The internal heating elements 42, 44 may sustain a temperature sufficient to volatilize the polymer component and form the hydrocarbon by-product. Suitable electrical resistance heating elements includes, but are not limited to, nickel chrome, and the like.

Throughout the process, both internal heating elements 42, 44 are operated to ensure a uniform temperature is maintained throughout the entire volume of each first reactor 14. In addition, the external heating element 33 and both internal heating elements 42, 44 are all operated to ensure a uniform temperature is maintained throughout the entire volume of each first reactor 14. The heating elements 33, 42, 44 placement within the mixing cavity 32 provide a favorable heat transfer to the composite material and ensures the composite material heats uniformly while being processed. In addition, the thermal insulating material 35 helps prevent heat loss, or at the very least provides for minimal heat losses, from the mixing cavity 32 and further ensures temperature control, favorable heat transfer conditions and uniform heating of the composite material.

The operating temperature throughout the entire volume of each first reactor 14 may be a temperature range of about 300° C. to about 700° C., and preferably a range of about 400° C. to about 600° C. The process of the present invention may be operated under a vacuum, rather than at atmosphere. However, whether operating the process under a vacuum or at atmosphere, the operating temperature is no less than at least about 400° C., as this temperature is necessary to volatilize the at least one polymer component present within the composite materials. These operating temperature ranges prevent the polymer component from deteriorating while being processed, and also promotes the generation of condensable, gaseous hydrocarbon by-products. When processing the polymer component(s) at a temperature below or above the ranges indicated, the polymer component can volatilize and form non-condensable, gaseous hydrocarbon by-products or both non-condensable, gaseous hydrocarbon by-products and soot. Soot, in turn, will contaminate the aluminum that remains after the polymer component(s) have been volatilized and removed during the first phase of the process carried out by the system 10 of the present invention.

The screws 34, 36 may driven by a means for driving 46 disposed externally to the first reactor 14. The means for driving 46 may comprise any type of mechanical device capable of causing the screws 34, 36 to rotate simultaneously in the same direction and at the same speed about their shafts 38, 40. For example, the first screw 34 may rotate at the same speed in a first direction indicated by an arrow 48 and the second screw 36 may rotate in a second direction indicated by an arrow 50 as depicted in FIG. 2c. One of ordinary skill in the art will recognize the screw operating conditions may be altered yet still accomplish the desired effects of the process of the present invention.

The screws 34, 36 are disposed adjacent to each other such that the screws 34, 36 are parallel to each other and do not make contact with one another. Each screw 34, 36 include a blade disposed along their shaft 38, 40, respectively, such that the blade is concentrically disposed about each shaft like a corkscrew and forms a plurality of blades and channels between each blade. Generally, the corkscrew orientation of the blade is commonly referred to as the helix of the screw. Being helically shaped, the blade(s) of each screw 34, 36 are curved from the tip to the shaft such that the surface of each blade is concave in nature. During operation, the first screw 34 rotates about the shaft 38 and the first helix of the first screw 34 enters the channels of the second helix of the second screw 36. The movement and orientation of the first helix through the channels of the second helix remove any molten polymer composition(s) from the screw 34 and shaft 40 and effectively clean screw 34 and shaft 40. The continual movement of the first, second screws 34, 36 effectuate the continual movement of the molten polymer component(s) along each screw 34, 36 and prevent the molten polymer component(s) from agglomerating within the mixing cavity 32 and along either screw 34, 36. Typically, as the polymer component(s) melt, the layers of polymer may form a thicker layer which can form a ball of molten polymer component(s) while rotating within a mixing cavity. The movement and orientation of the screws 34, 36 effectively prevent such agglomeration of molten polymer component(s) from occurring.

More specifically, as the first and second screws 34, 36 rotate simultaneously at the same speed and in the same direction, at least one first blade of the first screw rotates through at least one second channel of the second screw. As the first blades rotates, the first blade moves back and forth axially relative to a position of the second shaft of the second screw. The curvature of each first blade's surface facilitates this back and forth axial movement within each second channel relative to the position of the second shaft of the second screw. In contrast, a blade having no curvature, that is a flat shaped blade, and disposed perpendicularly to a second screw would not move axially back and forth within a channel of the second screw relative to a position of the second shaft of the second screw. Throughout the rotation of the screws and this back and forth axial motion of the first and second blades, the composite material is being processed by the first and second screws 34, 36 within the reactor 14. At the same time, the tip of the first blade is also removing the processed composite material from the shaft of the second screw and effectively cleaning the second shaft 40 and second screw 36. As the first blades of the first screw 34 clean the second screw 36, the second blades of the second screw 36 are also operating in the same manner to remove the processed composite material from the shaft of the first screw 34 and effectively clean the first shaft 38 and first screw 34.

For purposes of example, and not to be taken in a limiting sense, the dimensions of the first reactor may be sized accordingly with the intended processing conditions and industrial purpose. For example, each screw may have a length of about 1 meter to about 30 meters. Each screw may have a diameter of about 10 centimeters to about 150 centimeters. Each first blade of the first screw may be disposed about 1 millimeter to about 50 millimeters from each second blade and the second shaft of the second screw. And, each second blade of the second screw may be disposed about 1 millimeter to about 50 millimeters from each first blade and the first shaft of the first screw. A tip of each first blade may be positioned about 1 millimeter to about 50 millimeters from the second shaft of the second screw. And, a second tip of each second blade may be positioned about 1 millimeter to about 50 millimeters from the first shaft of said first screw.

Prior to volatilization, the polymer component(s) begin as large hydrocarbon chain compositions having more than about 100,000 carbon atoms per chain. During volatilization, the polymer component(s) begin breaking down into smaller hydrocarbon chain compositions each having less than about 100,000 carbon atoms per chain. As volatilization nears completion, the polymer component(s) break down into a plurality of small hydrocarbon chain compositions each having about 6 to about 10,000 carbon atoms per chain, preferably about 6 to about 1,000 carbon atoms per chain, most preferably about 6 to about 100 carbon atoms per chain, which forms the hydrocarbon by-product.

The hydrocarbon by-product preferably comprises hydrocarbon chains comprising no less than 6 carbon atoms per chain and no more than 100 carbon atoms per chain. Hydrocarbon chain compositions falling within the enumerated carbon atoms per chain range form condensable, gaseous hydrocarbon by-products under the operating conditions maintained within the first reactors 14. Such condensable, gaseous hydrocarbon by-products may be condensed to form hydrocarbon by-products desired by the market, for example, paraffinic compounds; a commodity that commands high market value. In contrast, hydrocarbon chain compositions containing less than 6 carbon atoms per chain form non-condensable, gaseous hydrocarbon by-products such as methane, ethane, propane and butane, which as commodities command far lower market value. Hydrocarbon chain compositions containing more than 100 carbon atoms per chain are unlikely to be generated in a gas form.

Throughout processing the composite material, the hydrocarbon by-product may be removed through the outlet 16 during the process. The hydrocarbon by-product may be condensed into a hydrocarbon product using a means for condensing 18. The means for condensing 18 may comprise any device capable of condensing hydrocarbons as known to one of ordinary skill in the art. When performing the process of the present invention, at least one hydrocarbon product is formed upon condensing the hydrocarbon by-product. For example, the hydrocarbon product may comprise a paraffin composition that contains paraffin in part (solid) and paraffinic oil in part (liquid) at room temperature. Depending upon the operating conditions of the means for condensing 18, any number of hydrocarbon products may be produced using the process of the present invention as the paper/plastic/aluminum and plastic/aluminum food and industrial packaging being recycled may each contain one or more different polymers.

Figure 3A:
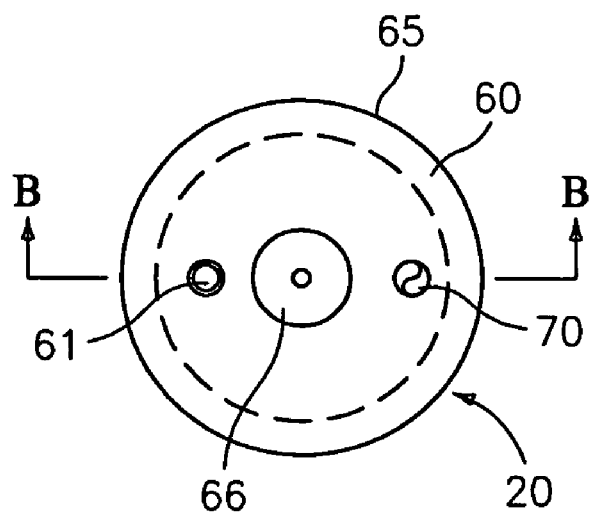
FIG. 3a is a representation of a top view of a second reactor of the system of FIGS. 1a and 1b.
Figure 3B:
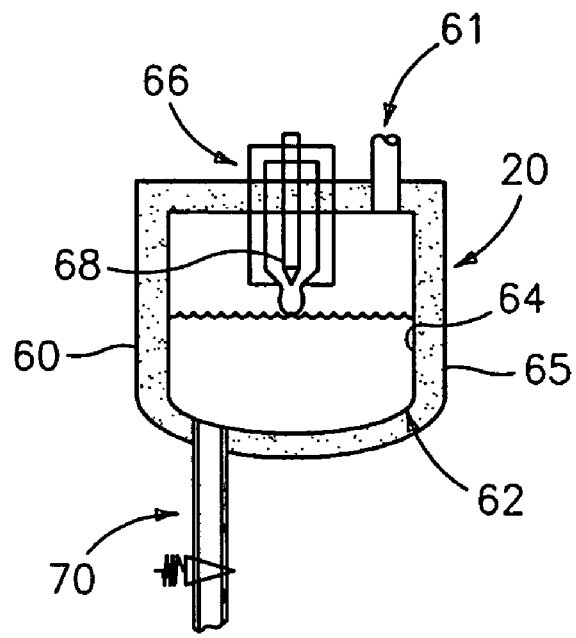
FIG. 3b is a representation of a cross-sectional view taken along lines B-B of FIG. 3a of the second reactor.

Once the polymer component(s) of the composite material have been volatilized and only aluminum remains, the pieces of aluminum coated with a thin film of aluminum oxide are transported into an injection port 61 of the second reactor 20 using a means for transporting 21 as known to one of ordinary skill in the art. Referring now to FIGS. 3*a* and 3*b*, the second reactor 20 preferably maintains a non-oxidizing environment and may comprise a shell 60 disposed about a cavity 62. The cavity 62 houses a melt bath 64 having a coating disposed thereupon. The coating comprises at least one material possessing refractory characteristics. Suitable materials possessing refractory characteristics for use herein may include, but are not limited to, silica, alumina, combinations comprising at least one of the foregoing, and the like, and preferably a mixture comprising about 70% by weight to 90% by weight of alumina and silica in the remainder. A quantity of thermal insulating material 65 may be disposed upon the external surface of the shell 60 in order to prevent heat loss, or at the very least provides for minimal heat losses, from the cavity 62. Suitable thermal insulating materials include, but are not limited to, fibrous ceramic materials, silica, alumina, combinations comprising at least one of the foregoing materials, and the like, and preferably a mixture of silica and alumina where the amount of silica present is greater than the amount of alumina present.

A plasma heating system 66 may be mounted to the shell 60 such that a plasma heating device 68 is disposed within the cavity 62. The plasma heating device 68 may be disposed proximate to and above the melt bath such that the device 68 can move back and forth across the surface of the melt bath and melt the aluminum free of at least one polymer component. A suitable plasma heating device 68 for use herein may comprise a swivable, transferable or non-transferable plasma torch capable of moving in any and all directions across the surface of the melt bath, for example, a sweeping motion, and capable of generating at least enough heat to break the aluminum oxide film and melt aluminum. Any number of inert gases as known to one of ordinary skill in the art may be utilized as the plasma gas. An inert gas, such as Ar, is preferred in order to maintain the non-oxidizing environment within the second reactor 20. The plasma heating device 68 may generate an electric arc having a temperature above about 10,000° C. (18,032° F.) which far exceeds the temperature of about 660° C. (1220° F.), the melting point of aluminum or about 1,700° C. (3,092° F.), the melting point of aluminum oxide. The aluminum oxide film melts and releases the aluminum contained within the oxide shell. Due to the absence of oxygen, the resulting aluminum liquid should be free of any oxides of aluminum.

As pieces of aluminum enter the melt bath 64, the plasma torch moves in a sweeping motion above the aluminum. The plasma torch arc strikes the aluminum and forms molten aluminum droplets and a layer of dross forms atop the molten aluminum. As additional aluminum enters the melt bath 64 and melts, a layer of dross forms and floats atop the molten aluminum. The dross layer insulates the molten aluminum from the high temperatures generated by the plasma torch. At the very surface of the dross layer having a thickness of about 1 millimeter to about 2 millimeters, the temperature reaches between about 2,000° C. to about 3,000° C. However, the temperature drops considerably below the dross surface such that the dross layer effectively insulates the molten aluminum. As a result, the molten aluminum can be maintained at a temperature of no more than about 800° C. during the process. Throughout the process, a graphite tool (not shown) may be used to periodically skim the surface of the melt bath 64 and remove the layer of dross. One of ordinary skill in the art will recognize any tool may be incorporated to achieve this purpose as well. As pieces of aluminum continually enter the second reactor 20, molten aluminum is also tapped in order to maintain a constant melt bath level. When tapping the molten aluminum, the molten aluminum may be cooled to a temperature of about 600° C. The resulting melted aluminum may be removed from the cavity 62 via an outlet 70 to form at least one aluminum by-product.

As discussed, paper/plastic/aluminum and plastic/aluminum packaging materials are not being recycled and/or not being recycled completely due to the intrinsic difficulties in separating plastic and aluminum as well as each component's physical and chemical properties. Common thermal separation (e.g., pyrolysis) of the two components is very difficult due to the heat transfer limitations caused by the plastic component and the insufficient weight of the aluminum in order to break up the aluminum oxide layer. Other prior art recycling processes, including chemical separation, have not succeeded either economically or environmentally.

The system and process of the present invention successfully recycles both paper/plastic/aluminum and plastic/aluminum packaging materials. Plastics composed of one or more polymers and aluminum of any thickness may now be separated and recycled rather than disposed as waste material. The system and process of the present invention possesses several advantages in carrying out this successful endeavor.

The process of the present invention is environmentally friendly. The process does not generate any type of environmentally harmful residue or toxic gaseous or liquid effluents. Throughout the process, the composite material is processed in sealed reactors and the release of the hydrocarbon by-product and aluminum by-product is controlled. And, unlike prior art methods for recycling plastic, plastic/aluminum or paper/plastic/aluminum composite materials, the process of the present invention does not require additional reagents to effectuate processing the composite materials.

The process of the present invention avoids the most common obstacle that has, until now, prevented recycling plastic/aluminum and paper/plastic/aluminum packaging. By maintaining non-oxidizing atmospheres and controlling the temperature throughout the process, aluminum oxide cannot form and prevent the recycling process. As a result, the hydrocarbon by-product and aluminum by-products in turn exhibit homogeneity, which equals quality.

The process of the present invention employs specially designed sealed reactors to ensure the composite materials are processed efficiently. The use of a specially designed sealed vessel and double self-cleaning screws permits the uniform heating and continuous processing of the polymer(s) in the composite material. This ensures the plastic does not deteriorate during the process. The use of a specially designed plasma system permits the melting of aluminum of any size and thickness, even when they are very thin. As a result, any aluminum oxide existing previously from the shell, the plasma system melts the aluminum oxide layer and releases the molten aluminum.

The process of the present invention is not only successful over failed attempts by the prior art but also efficient. The prior art processes typically lose at least forty percent (40%) of the aluminum when recycling plastic/aluminum and paper/plastic/aluminum composite materials. As a result, prior art processes cannot recover more than sixty percent (60%) of the aluminum when recycling these composite materials. The process of the present invention recovers at least approximately 90% of the aluminum. The overall energy efficiency of the process of the present invention is greater than approximately seventy-five percent (75%). The high efficiency is due in part to the intrinsic characteristics of the heating sources, that is, the external and internal heating sources and plasma torch, and also in part to the orientation of the heating sources and thermal insulation material within and about each reactor.

One or more embodiments of the present invention have been described. Nevertheless, it will be understood that various modifications may be made without departing from the spirit and scope of the invention. Accordingly, other embodiments are within the scope of the following claims.

What is claimed is:

1. A process for recycling composite materials, comprising:
    providing a quantity of recycled composite material comprising plastic/aluminum laminates having at least one polymer layer intimately joined to an aluminum layer;
    feeding the quantity of recycled composite material into at least one first reactor;
    heating said recycled composite material in a non-oxidizing environment at a temperature sufficient to volatilize said at least one polymer and form a hydrocarbon by-product and aluminum in said at least one first reactor wherein heating said composite material comprises forming at least one paraffinic compound;
    feeding said aluminum free of said at least one polymer into a second reactor; and
    heating said aluminum in a non-oxidizing environment at a temperature sufficient to melt said aluminum in said second reactor.

2. A process for recycling composite materials, comprising:
    providing a quantity of recycled composite material comprising plastic/aluminum laminates having at least one polymer layer intimately joined to an aluminum layer;
    feeding the quantity of recycled composite material into at least one first reactor;
    heating said recycled composite material in a non-oxidizing environment at a temperature sufficient to volatilize said at least one polymer and form a hydrocarbon by-product and aluminum in said at least one first reactor wherein heating said composite material comprises forming at least one paraffinic compound wherein heating said composite material comprises forming a hydrocarbon by-product comprising at least one hydrocarbon chain comprising about 6 to about 10,000 carbon atoms per chain;
    feeding said aluminum free of said at least one polymer into a second reactor; and
    heating said aluminum in a non-oxidizing environment at a temperature sufficient to melt said aluminum in said second reactor.

3. The process of one of claims 1 and 2, wherein heating said composite material comprises heating uniformly said composite material within a temperature range of between about 300° C. to about 700° C.

4. The process of claim 3, wherein said temperature range is between about 400° C. to about 600° C.

5. The process of claim 2, wherein heating said composite material comprises forming said hydrocarbon by-product comprising at least one hydrocarbon chain comprising about 6 to about 1,000 carbon atoms per chain.

6. The process of claim 5, wherein heating said composite material comprises forming said hydrocarbon by-product comprising at least one hydrocarbon chain comprising about 6 to about 100 carbon atoms per chain.

7. The process of one of claims 1 and 2, wherein heating said composite material comprises:
    introducing said composite material into a mixing cavity of said at least one first reactor;
    heating uniformly said composite material without causing said at least one polymer to deteriorate; and
    processing continuously said composite material.

8. The process of one of claims 1 and 2, further comprising:
    tapping said second reactor to remove said molten aluminum;
    maintaining a constant level of molten aluminum within said second reactor; and
    recovering said aluminum free of said at least one polymer.

9. The process of claim 8, wherein recovering comprises recovering at least about 90 percent of said aluminum free of said at least one polymer from said composite material.

10. A process for recycling composite materials, comprising:
    feeding a quantity of composite material comprising at least one polymer and aluminum into at least one first reactor;
    heating said composite material in a non-oxidizing environment at a temperature sufficient to volatilize said at least one polymer and form a hydrocarbon by-product and aluminum in said at least one first reactor wherein heating said composite material comprises:
    introducing said composite material into a mixing cavity of said at least one first reactor;
    heating uniformly said composite material without causing said at least one polymer to deteriorate, wherein heating uniformly comprises heating an entire volume of said at least one first reactor using a first internal heating element disposed in a first shaft of a first screw and a second internal heating element disposed in a second shaft of a second screw;
    feeding said aluminum free of said at least one polymer into a second reactor; and
    heating said aluminum in a non-oxidizing environment at a temperature sufficient to melt said aluminum in said second reactor.

11. A process for recycling composite materials, comprising:
    feeding a quantity of composite material comprising at least one polymer and aluminum into at least one first reactor;
    heating said composite material in a non-oxidizing environment at a temperature sufficient to volatilize said at least one polymer and form a hydrocarbon by-product and aluminum in said at least one first reactor wherein heating said composite material comprises:
    introducing said composite material into a mixing cavity of said at least one first reactor;
    heating uniformly said composite material without causing said at least one polymer to deteriorate, wherein heating uniformly comprises heating an entire volume of said at least one first reactor using an external heating element, a first internal heating element and a second internal heating element of said at least one first reactor;

feeding said aluminum free of said at least one polymer into a second reactor; and heating said aluminum in a non-oxidizing environment at a temperature sufficient to melt said aluminum in said second reactor.

12. The process of claim 11, wherein heating said entire volume of said at least one first reactor comprises:

heating said composite material using said external heating element disposed between said mixing cavity and a shell of said at least one first reactor; and heating said composite material using said first internal heating element disposed within a first screw and a second internal heating element disposed within a second screw of said at least one first reactor.

13. A process for recycling composite materials, comprising:

feeding a quantity of composite material comprising at least one polymer and aluminum into at least one first reactor;

heating said composite material in a non-oxidizing environment at a temperature sufficient to volatilize said at least one polymer and form a hydrocarbon by-product and aluminum in said at least one first reactor wherein heating said composite material comprises:

introducing said composite material into a mixing cavity of said at least one first reactor;

heating uniformly said composite material without causing said at least one polymer to deteriorate; and processing continuously said composite material, wherein processing continuously comprises:

(a) rotating simultaneously a first screw and a second screw at the same speed and in the same direction within said first reactor;

(b) rotating at least one first blade of said first screw through at least one second channel of said second screw, wherein said at least one first blade moves back and forth axially relative to the second shaft while said first screw and said second screw rotate;

(c) rotating at least one second blade of said second screw through at least one first channel of said first screw, wherein said at least one second blade moves back and forth axially relative to the first shaft while said first screw and said second screw rotate;

(d) processing said composite material with said first screw and said second screw;

(e) cleaning a surface of said first screw using said at least one second blade to remove said processed composite material from said first screw; and (f) cleaning a surface of said second screw using said at least one first blade to remove said processed composite material from said second screw;

feeding said aluminum free of said at least one polymer into a second reactor; and heating said aluminum in a non-oxidizing environment at a temperature sufficient to melt said aluminum in said second reactor.

14. A process for recycling composite materials, comprising:

feeding a quantity of composite material comprising at least one polymer and aluminum into at least one first reactor;

heating said composite material in a non-oxidizing environment at a temperature sufficient to volatilize said at least one polymer and form a hydrocarbon by-product and aluminum in said at least one first reactor;

feeding said aluminum free of said at least one polymer into a second reactor; and heating said aluminum in a non-oxidizing environment at a temperature sufficient to melt said aluminum in said second reactor, wherein heating said aluminum comprises:

(a) applying a plasma arc in a sweeping motion to said aluminum to form a quantity of molten aluminum and a layer of dross upon said molten aluminum; and (b) maintaining said quantity of molten aluminum at a temperature of no more than about 800° C.

15. The process of claim 14, wherein applying said plasma arc comprises generating said plasma arc using a plasma torch.

16. The process of claim 14, further comprising:

skimming a quantity of said dross layer from a surface of said molten aluminum; and repeating said skimming step at intervals of about thirty minutes to about sixty minutes throughout the process.

17. The process of claim 14, further comprising insulating said quantity of molten aluminum using said layer of dross having a temperature of about 2,000° C. to about 3,000° C.

* * * * *

UNITED STATES PATENT AND TRADEMARK OFFICE
CERTIFICATE OF CORRECTION

PATENT NO. : 7,648,561 B2  Page 1 of 1
APPLICATION NO. : 11/284606
DATED : January 19, 2010
INVENTOR(S) : Szente et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 829 days.

Signed and Sealed this

Twenty-eighth Day of December, 2010

David J. Kappos
*Director of the United States Patent and Trademark Office*